United States Patent

McIntosh

[15] 3,665,279

[45] May 23, 1972

[54] CONTROL SYSTEM FOR A MACHINE TOOL

[72] Inventor: Michael D. McIntosh, Greencastle, Pa.

[73] Assignee: Landis Tool Company, Beverly Hills, Calif.

[22] Filed: June 12, 1970

[21] Appl. No.: 45,832

[52] U.S. Cl.............................318/571, 318/603, 235/151.11
[51] Int. Cl. .......................................................G05b 19/24
[58] Field of Search......................318/571, 603; 235/151.11

[56] References Cited

UNITED STATES PATENTS 3,541,417 11/1970 Frank, Jr............................318/603 X
3,539,896 11/1970 Reuteler et al. ........................318/571

Primary Examiner—Benjamin Dobeck
Attorney—Diller, Brown, Ramik & Holt

[57] ABSTRACT

A control system for a machine tool which utilizes an electrohydraulic pulse motor to move a machine tool element is described. The pulse motor is energized from a decoder drive circuit which receives signals from a binary coded decimal counter having its input coupled to the output of a binary rate multiplier. The binary rate multiplier, in turn, receives as its inputs pulses of predetermined repetition rates from a crystal controlled frequency divider and preselected binary coded decimal signals from one or another of a plurality of rate sources. A controller is arranged, via logic circuits, to select one or another of various outputs from the frequency divider as one of the inputs to the binary rate multiplier. The controller also selects which of the plurality of rate sources provides a binary coder decimal signal to the rate multiplier.

30 Claims, 1 Drawing Figure

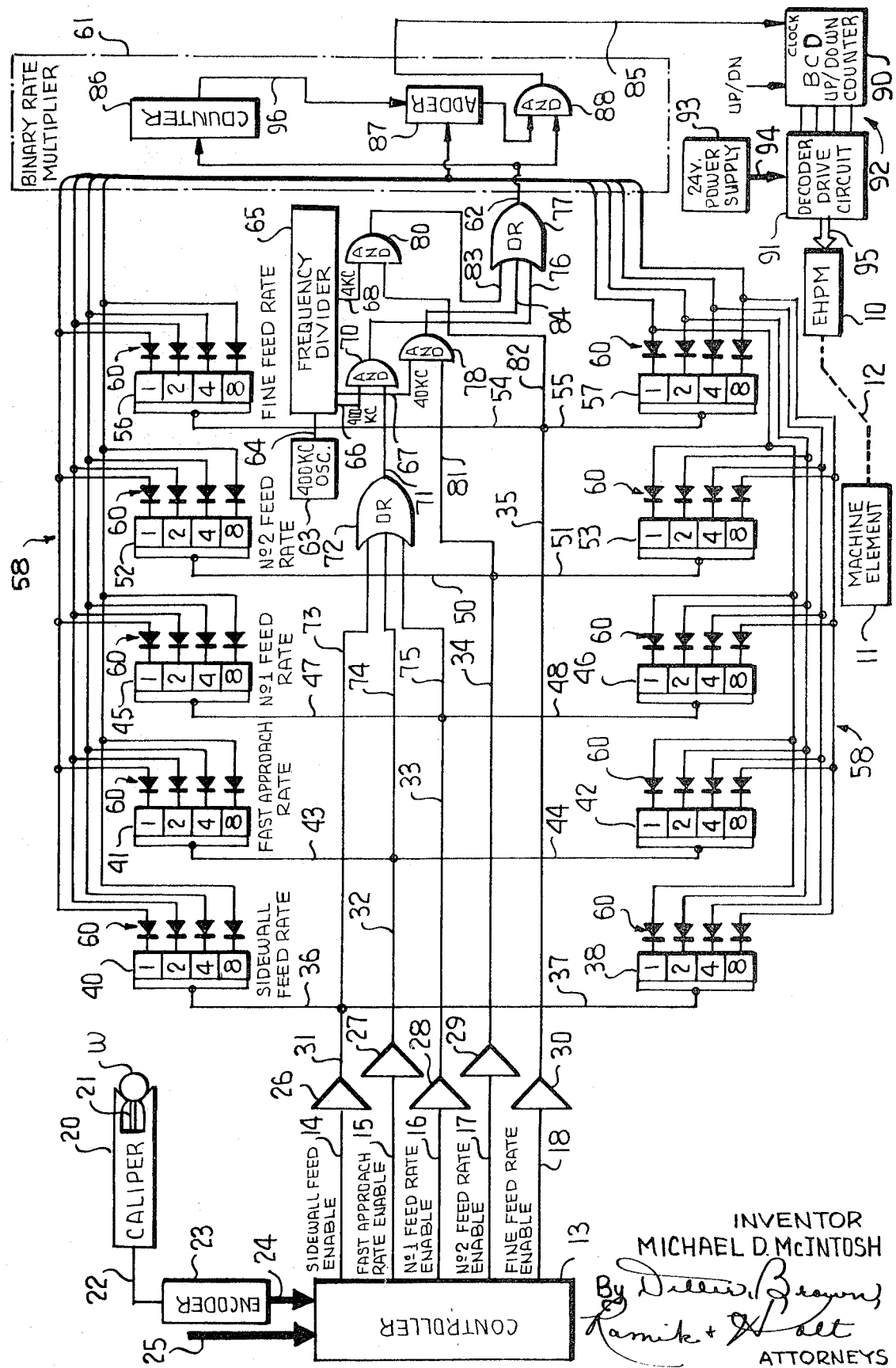

CONTROL SYSTEM FOR A MACHINE TOOL

This invention relates in general to new and useful improvements in a control system for providing a selectable variable feed rate for a machine tool element. In particular, the invention relates to a control system which utilizes a binary rate multiplier as an element of the control system. The invention also relates to a new and useful binary rate multiplier which includes a counter, an adder, and an AND circuit.

In many prior art arrangements, a single grinding feed rate was used for essentially all diameters of a workpiece until an increment feed or fine feed rate was effected just before feed completion.

Prior to this invention, it has been proposed to use an electro-hydraulic pulse motor for moving a machine element, such as a grinding wheel support in a grinding machine. The pulse motor was energized under the control of timed outputs from a combination of frequency dividers. A multiple number of input leads were required and, as a practical matter, a limited variation of feed rates were provided.

In accordance with the present invention, means are provided for controlling the feed rate of a machine tool element; e.g., a grinding wheel support of a grinding machine. The machine tool element is advanced at a variable feed rate during a cycle of operation for grinding workpiece diameters automatically. The apparatus for actuating a machine element through a predetermined cycle of operation, in accordance with one aspect of the invention, includes a crystal controlled frequency divider for providing pulse trains of pre-selected different repetition rates. Manually operated switches are provided as part of a means for providing predetermined binary coded decimal signals. A controller is provided as a source of control signals which are utilized to select one or another of the pulse trains and particular ones of the binary coded decimal signals. The selected pulse train and the selected binary coded decimal signals are fed to a binary rate multiplier which has its output connected to means for actuating a pulse motor so that the pulse motor may move the machine tool element through the cycle of operation.

It will be readily apparent that when a workpiece having a single or different diameter portions is to be ground, it is highly desirable that a production tool be automatically adjusted rapidly so that the in-feed rate during a plunger grinding operation be proportional with respect to the diameter of the workpiece.

In accordance with the foregoing, it is an object of this invention to provide a binary rate multiplier particularly suitable as an element of a control system in a machine tool.

It is another object of this invention in a machine tool to provide a control system which includes means for actuating a pulse motor so that the pulse motor may move a machine tool element, which may be a support for a grinding wheel, through a predetermined cycle of operation.

Still another object of this invention in a machine tool, is to provide a control system which is very flexible so that a pulse motor can move a machine tool element at one or a great many different rates during a cycle of operation as determined by a controller.

Yet another object of this invention in a machine tool is to provide an arrangement in which a wide range of pulse repetitive rates may be utilized to actuate a pulse motor so that the pulse motor may move the machine tool element through a cycle of operation over a wide range of rates.

Yet another object of this invention in a machine tool is to provide a system which utilizes a crystal controlled oscillator, a pulse producing frequency divider and a binary rate multiplier for supplying pulses to a pulse motor so that the pulse motor may move a machine tool element through a predetermined cycle of operation determined by a controller.

A further object of this invention in a machine tool is to provide a plurality of adjustable sources of binary signals and a binary rate multiplier for supplying pulses to a pulse motor so that the pulse motor may move a machine tool element through a predetermined cycle of operation determined by a controller.

A still further object of this invention in a machine tool is to provide a control system which utilizes a crystal controlled oscillator, a pulse producing frequency divider, a plurality of adjustable sources of binary signals and a binary rate multiplier which supplies pulses to a pulse motor so that the pulse motor may move a machine tool element through a predetermined cycle of operation determined by a controller.

With the above and other objects in view, as will hereinafter appear, the nature of the invention will be more clearly understood by reference to the detailed description, the appended claims and the illustration in the accompanying drawing.

In the drawing:

The sole FIGURE is an illustrative embodiment of a feed rate control system for a machine tool incorporating the rate multiplier of the present invention.

Referring now to the drawing in detail, a control system for driving a stepping electro-hydraulic pulse motor 10 is illustrated. The electro-hydraulic pulse motor 10 is coupled to a machine tool element 11, which may be a grinding wheel support in a machine tool, by mechanical linkage indicated generally by the numeral 12. In practice, the mechanical linkage preferably includes gears. The electro-hydraulic pulse motor may, in a practical embodiment, consist of an Icon Model 1-SSS. This particular Icon electro-hydraulic pulse motor is designed so that it rotates one revolution for each 240 pulses applied to its input. The gearing is arranged so that each pulse is effective to move the machine tool element 11 0.000050 of an inch.

The control system includes a controller 13 which is provided with five output leads identified by the numerals 14–18. One input to the controller 13 is provided by a caliper 20 which is arranged to sense the diameter of a workpiece W. The caliper 20 includes a probe 21 which is connected to a core of a transducer. The probe 21, as illustrated, is held in engagement with the workpiece W by means of a spring (not shown). The details of a suitable caliper 20 are shown in FIG. 1 of U.S. Pat. No. 3,157,971, granted Nov. 24, 1964. The output of the caliper 20 is coupled via a lead 22 to an encoder 23 for transforming the output of the caliper 20 into binary signal data which, in turn, is fed to the controller 13 by a wiring generally indicated by the numeral 24. The controller 13 is provided with additional input data by wiring indicated generally by the arrow 25. The controller 13 is programmed and designed to supply a number of enable signals which appear individually on the output leads 14 through 18. It will be readily understood by those skilled in the art, that the controller 13 is arranged to provide an enable signal on one or the other of the leads 14–18 at one time.

Each of the leads 14–18 is connected respectively to an input of amplifiers 26–30 which serve to amplify the enable signals appearing on their respective inputs.

Each of the amplifiers 26–30 is provided respectively with an output lead 31–35. The lead 31 is respectfully connected via a lead 36 and a lead 37 to side wall feed rate selecting switches 40 and 38 for passing an amplified side wall feed enable signal to the side wall feed rate switches 38 and 40. In a similar fashion, fast approach rate selecting switches 41 and 42 have their inputs connected respectively via a lead 43 and a lead 44 to the lead 32 for receiving an amplified fast approach rate enable signal from the amplifier 27. Similarly, No. 1 feed rate selecting switches 45 and 46 are connected respectively via leads 47 and 48 to the lead 33 on which appears, as the output from the amplifier 28, an amplified No. 1 feed rate enable signal. A lead 50 and a lead 51 are connected to the lead 34 for receiving an amplified No. 2 feed rate enable signal therefrom and couple respectively the amplified signal to No. 2 feed rate selecting switches 52 and 53. In a similar fashion, a lead 54 and a lead 55 are connected to the lead 35 for coupling an amplified fine feed rate enable signal to fine feed rate selecting switches 56 and 57, respectively.

In a practical embodiment, the side wall feed rate selecting switches 38 and 40 comprise numbered thumbwheel switches arranged to be manually set by a machine operator. It will be appreciated by those skilled in the art that the thumb wheel switches are designed so that the rate selector switches 38 and 40 provide binary coded decimal signals corresponding to the decimal numbers 0 to 99 depending on the desire of an operator who may manually adjust a thumbwheel (not illustrated) forming part of the sidewall feed rate selecting switch 40 to provide a possible high (1) signal condition or a possible low (0) signal condition as individual outputs appearing on four output leads from the switch 40 upon the occurrence of an amplified sidewall enable signal from the amplifier 26. In a practical embodiment, the high (1) signal condition is provided by simply passing the amplified sidewall feed enable signal to selected ones of the four output leads of the switch 40. The low (0) signal condition is established by simply connecting selected ones of the four output leads of the switch 40 to a point of reference potential (not illustrated). As will be clear to those skilled in the art, the individual outputs from the switch 40 represent bits from the least-significant-bit to the most-significant-bit of a binary coded decimal number. Similarly, a thumbwheel (not illustrated) forming part of the sidewall feed rate selecting switch 38 may be manually adjusted to provide an additional four bit binary coded decimal signal. Since the same enable signal is applied to both switches 38 and 40 at the same time, the switches may provide selectable binary coded decimal signals corresponding to the decimal numbers 0 to 99, as will be readily apparent to those skilled in the art.

The fast approach rate selecting switches 41 and 42, and the No. 1 feed rate selecting switches 45 and 46 include thumbwheels (not illustrated) and are otherwise constructed similarly to the feed rate switches 38 and 40. Likewise, each of the No. 2 feed rate switches 52 and 53, and each of the fine feed rate switches 56 and 57 also include a thumbwheel (not illustrated).

Each of the rate selecting switches 38, 40-42, 45, 46, 52, 53, 56 and 57 has each of its four outputs coupled to wiring 58 via an isolating diode, the isolating diodes being illustrated generally by the numeral 60. Each of the isolating diodes 60 effectively buffer an output from one feed rate switch from the outputs of other feed rate switches so that the feed rate switches may individually be said to provide low (0) outputs on selected output leads without grounding out or undesirably establishing false low signal conditions for corresponding significant bits from other feed rate switches. The wiring 58 is connected to a binary rate multiplier 61, and serves to couple binary coded decimal signals from the feed rate switches 38, 40-42, 45, 46, 52, 53, 56 and 57, as they are enabled, to the binary rate multiplier 61.

In addition to the binary coded decimal inputs available from the wiring 58, the binary rate multiplier 61 is provided with a second input from a lead 62. As will hereinafter appear, a train of pulses of various selected repetition rates may appear on the lead 62.

A 400 KC crystal-control oscillator 63 is arranged to supply, via a lead 64, an input to a pulse-producing frequency divider 65 which, as illustrated, has three output leads 66, 67 and 68 on which appears pulse trains having respectively a 400 KC repetition rate, a 40 KC repetition rate and a 4 KC repetition rate. The lead 66 supplies the pulse train having a 400 KC repetition rate as a first input to an AND circuit 70 which has a second input thereof connected by a lead 71 to an output of an OR circuit 72. The OR circuit 72 is provided with three input leads 73, 74 and 75 which are connected respectively to the leads 31, 32 and 33 on which may appear respectively amplified enable signals from the amplifiers 26, 27 and 28. An output from the AND circuit 70 is connected, via a lead 76, to an input of an OR circuit 77.

The leads 67 and 68 are connected respectively to the first inputs of an AND circuit 78 and an AND circuit 80 for supplying pulse trains having respectively a repetition rate of 40 KC and 4 KC as first inputs to the respective AND circuits 78 and 80. Each of the AND circuits 78 and 80 is provided with second inputs via leads 81 and 82, respectively. The lead 81 is connected to the lead 34 on which may appear amplified No. 2 feed rate enable signals, and the lead 82 is connected to the lead 35 on which may appear amplified fine feed rate enable signals.

An output from each of the AND circuits 78 and 80 is connected via respective leads 83 and 84 as a second input and a third input to the OR circuit 77. The output from the OR circuit 77 appears on the lead 62 which supplies a selected pulse train input to the binary rate multiplier 61. It will be evident to those skilled in the art that one or another of the outputs from the pulse-producing frequency divider 65 will appear on the lead 62 depending on which feed rate enable signal is being supplied from the controller 13 to the OR circuits 72 and 77, and the AND circuits 70, 78 and 80. An output lead 85 is connected to the binary rate multiplier 61 for receiving an output signal therefrom.

The binary rate multiplier 61 includes a counter 86, an adder 87, and an AND circuit 88. The pulse train of predetermined repetition rate which may appear on the input lead 62 of the binary rate multiplier 61 supplies a selected pulse train as the input to the counter 86 and as a first input to the AND circuit 88. An output from the counter 86 is connected as a first input to the adder 87, which receives binary coded decimal signals from the wiring 58 as its second input, and has its output coupled as a second input to the AND circuit 88. The lead 85 is connected to an output of the AND circuit 88.

The lead 85 is connected to a clock input of a binary coded decimal up/down counter 90 for supplying an output signal from the binary rate multiplier 61 to the counter 90. The binary coded decimal counter 90 is also provided with an up/down input terminal designated generally by the arrow 89. The output from the binary coded decimal up/down counter 90 is coupled to a decoder drive circuit 91 via wiring 92. A multi-phase 24 volt AC power supply 93 is connected to the decoder drive circuit 91 via wiring generally designated by the arrow 94. The output of the decoder drive circuit 91 is coupled to the electro-hydraulic pulse motor 10 by connective means generally designated by the arrow 95.

It will be appreciated that the caliper 20 is not, in operation, constantly in contact with the workpiece W. In a practical embodiment, the probe 21 of the caliper 20 is brought into contact with the workpiece W at the end of the No. 2 feed rate and fine feed rate portions of a cycle of operation. The controller 13 includes devices for comparing the sensed dimension of a workpiece W with the desired dimension of the workpiece W which may take the form of the arrangement disclosed in the co-pending application of Michael D. McIntosh, Ser. No. 880,078, filed Nov. 26, 1969 and entitled Control System for a Machine Tool.

OPERATION

To place the rate control system in operation, the thumbwheels (not illustrated) associated with the feed rate switches 38, 40-42, 45, 46, 52, 53, 56 and 57 are set to provide predetermined binary coded decimal signals in accordance with the desire of the operator, and power is supplied to the system from a power supply arrangement (not illustrated).

With the application of suitable power, the oscillator 63 begins to oscillate at 400 KC supplying an input to the pulse producing frequency divider 65. A 400 KC pulse train appears on the lead 66, a 40 KC pulse train appears on the lead 67, and a 4 KC pulse train appears on the lead 68. Each of the pulse trains appears respectively as an input to the AND circuits 70, 78 and 80. Since signals on the leads 71, 81 and 82 are, as yet, in a low (0) condition, the AND circuits 70, 78 and 80 do not pass the aforementioned pulse trains to their respective output leads 76, 84 and 83.

A start signal, indicating that workpiece W is correctly positioned in the machine tool, appears on wiring 25, causing the controller 13 to provide a sidewall feed enable signal on the lead 14. The amplifier 26 amplifies the sidewall feed enable signal which, as amplified, appears on the lead 31. The amplified sidewall feed enable signal is coupled respectively, via the leads 36 and 37 to the sidewall feed rate switches 40 and 38. The amplified sidewall feed rate enable signal is effectively passed, via individual switching members within the sidewall feed rate switches 38 and 40 and by output leads and isolating diodes 60 to the wiring 58 as high (1) condition signals in accordance with the setting previously made by an operator of the individual switch members within the sidewall feed rate enable switches 38 and 40 with the thumbwheels (not illustrated). Thus, binary coded decimal signals appear on the wiring 58 in accordance with the predetermined setting of the thumbwheels (not illustrated) associated with the sidewall feed rate switches 38 and 40. The predetermined binary coded decimal signals are coupled to the binary rate multiplier 61 and appear as a first input to the adder 87. Concurrently with the appearance of amplified enable signals on the leads 36 and 37, an amplified enable signal appears on lead 73, and is passed through the OR circuit 72, appearing as an output on the lead 71 thereby enabling the AND circuit 70. When the AND circuit 70 is enabled by the appearance of a high (1) output signal from the OR circuit 72 on the lead 71, the 400 KC pulse train is passed via the lead 76 as an input to the OR circuit 77 which, in turn, passes the 400 KC pulse train as an input to the binary rate multiplier 61 via the lead 62. Within the binary rate multiplier 61, the 400 KC pulse train is coupled to an input of the AND circuit 88 and to the input of the counter 86.

An output lead 96 from the counter 86 is coupled as a second input to the adder 87, which receives as well the binary coded decimal signals from the wiring 58. The carry output from the adder 87 appears as an input to the AND circuit 88. An output appears on the lead 85 from the AND circuit 88 which is directly proportional to the binary coded decimal inputs and the 400 KC input. The adder 87 is used as a comparator to provide a pulse frequency which will effect the speed of the pulse motor 10.

The output on the lead 85 from the AND circuit 88 provides a clock input to the binary coded decimal up/down counter 90 which, in turn, has its output coupled to the decoder drive circuit 91 which controls the application of pulse multi-phase power from the 24 volt power supply 93 to the electro-hydraulic pulse motor 10 which, via mechanical linkage 12, moves the machine element 11 at a speed determined by the pulse rate from the output from the AND circuit 88.

As can be seen from the foregoing, the machine element 11 will advance at a selected given rate, depending on the setting of the switches 38 and 40 as well as the frequency selected for the oscillator 63, until later the sidewall feed enable signal disappears from the lead 14.

When a signal is provided from the wiring 25 indicating that the sidewall feed is completed in accordance with a desired program, the amplified sidewall feed enable signal appearing on the lead 31 disappears thereby removing the binary coded decimal signals, provided by the switches 38 and 40, from the wiring 58 to effect a low (0) signal condition to exist on the lead 71 whereby the AND circuit 70 is disabled resulting in the disappearance of the 400 KC pulse train from the lead 76. Thus, the 400 KC pulse train which appeared on the lead 62 disappears from the lead 62. Accordingly, both the binary coded decimal input signal and the pulse train signal previously supplied to the binary rate multiplier 61 are no longer supplied and the output from the binary rate multiplier disappears. Thus, the binary coded decimal up/down counter 90 no longer is provided with a clock input, and the electro-hydraulic pulse motor 10 may become stationary.

An additional control signal is provided from the wiring 25 in accordance with a desired program of operation causing the controller 13 to provide a fast approach rate enable signal on the lead 15 which, in turn, is amplified by the amplifier 27 establishing an amplified fast approach rate enable signal on the lead 32. The lead 32, being coupled respectively to the fast approach rate switches 41 and 42 via the leads 43 and 44 results in the appearance on the wiring 58 of binary coded decimal signals predetermined by the setting of the thumbwheels (not illustrated) associated with the rate switches 41 and 42. The amplified fast approach rate enable signal is also coupled, via the lead 74, to an input of the OR circuit 72 thereby enabling the AND circuit 70 providing for the passage input to the binary rate multiplier 61 which also receives binary coded decimal signals via the wiring 58 from the rate switches 41 and 42. An output from the binary rate amplifier 61 again appears on the lead 85 causing the binary coded decimal up/down counter 90 to again provide an output to the decoder drive circuit 91 causing the electro-pulse motor 10 to advance the machine element 11 until the fast approach rate enable signal disappears from the lead 15 by action of the controller 13. On the disappearance of the fast approach rate enable signal from the lead 15 or, if desired, after a predetermined time elapse, the controller 13 in accordance with the program signals provided from the wiring 25 establishes a No. 1 feed rate enable signal on the lead 16 which is amplified by the amplifier 28. The amplified output, which appears on the lead 33, is coupled respectively via the leads 47 and 48 to the rate switches 45 and 46 thereby establishing on the wiring 58 binary coded decimal signals predetermined by the setting of the thumbwheels (not illustrated) associated with the feed rate switches 45 and 46. The amplified No. 1 feed rate enable signal appearing on the lead 33 is also coupled via the lead 75 to the OR circuit 72 thereby establishing on the lead 62 and 400 KC pulse train via the AND circuit 70 and the OR circuit 77. Again an output appears on the lead 85 from the binary multiplier 61 as the clock input to the binary coded decimal up/down counter 90 and operates, via the decoder drive circuit 91 to advance again the electro-hydraulic pulse motor 10 until the No. 1 feed rate enable signal disappears from the lead 16 in accordance with a predetermined program established by the controller 13 and input signals appearing from the wiring 25.

Upon the disappearance of the No. 1 feed rate enable signal from the lead 16, the caliper 20 is brought into contact with the workpiece W by instrumentalities not illustrated, and the controller 13 establishes a No. 2 feed rate enable signal on the lead 17. The No. 2 feed rate enable signal is amplified by the amplifier 29 and appears on the lead 34 from which it is coupled to the No. 2 feed rate selector switches 52 and 53 via the leads 50 and 51, respectively. Binary coded decimal signals again appear on the wiring 58 in accordance with the position of the thumbwheels (not illustrated) associated with the switches 52 and 53. The amplified No. 2 feed rate enable signal is also coupled, via the lead 81, as an input to the AND circuit 78 which has its other input coupled via the lead 67 to receive a 40 KC pulse train from the pulse producing frequency divider 65. Upon the appearance of the enable signal on the lead 81, the 40 KC pulse train is passed through the AND circuit 78 to the lead 84 as an input to the OR circuit 77. The OR circuit 77, in turn, passes the 40 KC pulse train to the lead 62 thereby providing an input to the binary rate multiplier 61 which differs, by a factor 10, from the 400 KC pulse train provided upon the occurrence of the first-mentioned three enable signals. Again an output from the binary rate multiplier 61 appears on the lead 85 and the electro-hydraulic pulse motor advances the machine element 11 at a somewhat lower speed determined by the 40 KC pulse train and the binary coded decimal signals established by the feed rate switches 52 and 53.

The No. 2 feed rate enable signal remains on the lead 17 and the machine element 11 continues to be advanced towards its final position until the encoder 23 provides a signal to the controller 13 indicating that the actual diameter of the workpiece W, as determined by the caliper 20, is a given diameter somewhat greater than the desired final diameter for the workpiece W. Upon sensing of the predetermined greater diameter than the final diameter for the workpiece W, the controller 13 acts to remove No. 2 feed rate enable signal from the lead 17 and, as before, the clock input to the binary coded decimal up/down counter 90 disappears from the lead 85 and the electro-hydraulic pulse motor 10 ceases to advance the machine element 11 until a fine feed rate enable signal appears on the lead 18 from the controller 13.

The fine feed rate enable signal which appears on the lead 18, is amplified by the amplifier 30 and appears on the lead 35. The amplified fine feed rate enable signal appearing on the lead 35 is coupled respectively to the fine feed rate switches 56 and 57 via the leads 54 and 55. In turn, the fine feed rate switches 56 and 57 provide as outputs to the wiring 58 binary coded decimal signals in accordance with the setting of the fine feed rate switches 56 and 57 previously established by the thumbwheels (not illustrated) associated with the fine feed rate switches 56 and 57. The binary coded decimal signals appearing on the wiring 58 provides an input to the binary rate multiplier 61.

The amplified fine feed rate enable signal appearing on the lead 35 is coupled, via the lead 82, to an input of the AND circuit 80 thereby enabling the AND circuit 80 to pass a 4 KC pulse train from the lead 68 to the OR circuit 77 via the lead 83. Thus, a 4 KC pulse train appears on the lead 62 as a second input to the binary rate multiplier 61.

As before, an output from the binary rate multiplier 61 appears on the lead 85 as the clock input to the binary coded decimal up/down counter 90, the decoder drive circuit 91 is activated thereby causing the electro-hydraulic pulse motor 10 to rotate advancing, at a relatively slow fine feed rate, the machine element 11.

The clock input appearing on the lead 85 continues, and the machine element 11 advances until the encoder 23 provides a signal to the controller 13 indicating that the caliper 20 senses that the diameter of the workpiece W has been reduced to the final desired diameter. When the caliper 20 signals that the final diameter of the workpiece W has been reached, the controller 13 removes the fine feed rate enable signal from the lead 18, and the machine element 11 ceases to advance. Thus, the desired cycle of operation is completed. It will be appreciated, in a grinding tool, that the machine element 11 is a grinding wheel support, and that the grinding wheel need not necessarily be immediately retracted, but as a practical matter may be allowed to rotate for a short additional period of time, known as spark out time, to remove small irregularities and burrs which may remain on the ground surface of the workpiece W.

It is to be understood that although the invention has been specifically described in conjunction with a machine element which preferably is a grinding wheel for a grinding machine, the invention is not so limited. It is to be understood that the invention may be utilized in other types of machine tools as well. It is also to be appreciated that in certain machines, it may be more feasible or desirable to hold the machining element in a relatively fixed position and to advance the workpiece.

It will also be understood that although the invention, in a preferred aspect, is related to the control of machine tools, the invention is not so limited, and is a control system which may be used in conjunction with other types of apparatus and in different process control environments as well where it is desired to provide predetermined variable feed rates or variable rate signals.

Those skilled in the art too will readily appreciate that the specific binary rate multiplier 61, which includes the counter 86, the adder 87 and the AND circuit 88 may be used in conjunction with different circuitry or control systems in which it is desired to multiply binary signals.

While one embodiment of the invention has been shown for purposes of illustration, it is to be understood that various changes in the details of construction and arrangement of the parts may be made without departing from the spirit and scope of the invention as defined in the appended claims.

What is claimed is:

1. In a machine tool, a movable machine element, a pulse motor connected to said machine element for effecting controlled movement thereof at selected rates, and control means for controlling the operation of said pulse motor comprising means for providing pulses at a predetermined repetition rate, means for providing at least two different binary signals, binary rate multiplier means receiving said pulses and a selected one of said binary signals for providing an output signal which is a selected multiple of said pulse rate as determined by said selected binary signals, means receiving said output signal for actuating said motor, and selector means for selecting the binary signals delivered to said binary rate multiplier means for controlling the rate of movement of said machine element by said pulse motor.

2. The apparatus defined in claim 1 wherein said binary rate multiplier comprises
   a. a counter means having an input and an output,
   b. means coupling said pulses of said preselected repetition rate to the input of said counter means,
   c. an adder means having a first input, a second input and an output,
   d. means coupling the output of said counter means to said first input of said adder means,
   e. means for coupling said binary signals to said second input of said adder means,
   f. an AND circuit,
   g. means for coupling said pulses of said predetermined repetition rate to a first input of said AND circuit,
   h. means for coupling the output of said adder means to a second input of said AND circuit, and
   i. means coupled to an output of said AND circuit for actuating said pulse motor.

3. The apparatus defined in claim 2 wherein said means coupled to an output of said AND circuit includes a binary counter coupled to said output of said AND circuit for providing a binary output, a decoder means receiving the last said output for providing an input to said pulse motor.

4. The apparstus defined in claim 1 wherein said means for providing predetermined binary signals provides a binary coded decimal signal.

5. The apparatus defined in claim 1 wherein said means for providing predetermined binary signals is adjustable whereby a particular binary signal may be provided from among several possibilities.

6. The apparatus defined in claim 1 wherein said selector means include a work measuring caliper of said machine tool, and an output signal from said caliper.

7. The apparatus defined in claim 1 wherein said means for providing pulses are connected to a frequency divider for providing said pulses in a plurality of different predetermined repetition rates, said means for providing predetermined binary signals include a plurality of different predetermined binary signals and selector means for selecting one of said different predetermined binary signals, and circuit means responsive to the selected one of said binary signals determining the one of said different pulse repetition rates to be connected to said binary rate multiplier means.

8. The apparatus of claim 7 wherein said circuit means include an AND circuit for each pulse repetition rate, each AND circuit having first and second inputs connected to the respective pulse repetition rate signal and to said selector means.

9. The apparatus of claim 7 wherein said means for providing pulses includes a pulse generator and a frequency divider receiving pulses therefrom, said frequency divider having a plurality of different pulse rate outputs.

10. The apparatus of claim 1 wherein said selector means are responsive to operating conditions of said machine tool to automatic step from one of said binary signals to the other.

11. In a machine tool, means for actuating a machine element through a predetermined cycle of operation comprising
   a. means for providing pulses at different predetermined repetition rates,
   b. a source of control signals, c. means responsive to said source of control signals for selecting pulses of one or another of said different pulse repetition rates, d. means for providing predetermined binary signals, e. a binary rate multiplier means receiving said predetermined binary signals and the selected pulses of said one or another of said different pulse repetition rates for providing an output signal, and f. means receiving said output signal for actuating a pulse motor, whereby said pulse motor may move said machine element through said cycle of operation at a rate determined by said binary signals and the selected one of said pulses of predetermined rate.

12. The apparatus defined in claim 11 wherein said binary rate multiplier comprises
   a. a counter means having an input and an output,
   b. means coupling said pulses of said one or another of said different repetition rates to the input of said counter means,
   c. an adder means having a first input, a second input and an output,
   d. means coupling the output of said counter means to said first input of said adder means,
   e. means for coupling said binary signals to said second input of said adder means,
   f. an AND circuit,
   g. means for coupling said pulses of said one or another of said different repetition rates to a first input of said AND circuit,
   h. means for coupling the output of said adder means to a second input of said AND circuit, and
   i. means coupled to an output of said AND circuit for actuating said pulse motor.

13. The apparatus defined in claim 12 wherein said means coupled to an output of said AND circuit includes a binary counter coupled to said output of said AND circuit for providing a binary output, a decoder means receiving the last said output for providing an input to said pulse motor.

14. The apparatus defined in claim 11 wherein said means for providing predetermined binary signals provides a binary coded decimal signal.

15. The apparatus defined in claim 11 wherein said means for providing predetermined binary signals is adjustable whereby a particular binary signal may be provided from among several possibilities.

16. The apparatus defined in claim 11 including said pulse motor, said pulse motor being mechanically coupled to said machine element.

17. The apparatus defined in claim 12 including said pulse motor, said pulse motor being mechanically coupled to said machine element.

18. The apparatus defined in claim 13 including said pulse motor, said pulse motor being mechanically coupled to said machine element.

19. The apparatus defined in claim 14 including said pulse motor, said pulse motor being mechanically coupled to said machine element.

20. The apparatus defined in claim 11 wherein said means for providing binary signals comprises a plurality of sources of binary signals, and further including means receiving control signals from said source of control signals for transferring binary signals from one or another of said plurality of sources to said binary rate multiplier means.

21. The apparatus defined in claim 20 wherein each of said plurality of sources is adjustable whereby a particular binary signal may be provided from among several possibilities from said each source.

22. The apparatus defined in claim 12 wherein said means for providing binary signals comprises a plurality of sources of binary signals, and further including means receiving control signals from said source of control signals for transferring binary signals from one or another of said plurality of sources to said binary rate multiplier means.

23. The apparatus defined in claim 22 wherein each of said plurality of sources is adjustable whereby a particular binary signal may be provided from among several possibilities from said each source.

24. The apparatus defined in claim 20 including said pulse motor, said pulse motor being mechanically coupled to said machine element.

25. The apparatus defined in claim 21 including said pulse motor, said pulse motor being mechanically coupled to said machine element.

26. The apparatus defined in claim 22 including said pulse motor, said pulse motor being mechanically coupled to said machine element.

27. The apparatus defined in claim 23 including said pulse motor, said pulse motor being mechanically coupled to said machine element.

28. The apparatus defined in claim 11 wherein said control signals are in accordance with machine operating conditions.

29. The apparatus defined in claim 11 wherein said control signals are in accordance with an output signal of a work measuring caliper of said machine tool.

30. In a machine tool, means for actuating a machine element through a predetermined cycle of operation comprising
   a. a pulse motor,
   b. an input means for said pulse motor including
   c. means for providing pulses of different repitition rates, and
   d. means for applying selectively one or more of said pulses to said pulse motor to move said machine element at a predetermined rate, including:
      1. a counter means,
      2. a gate means,
      3. connective means from said counter means and said gate means to said input means,
      4. an adder means,
      5. an output coupling means from said counter means to said adder means,
      6. a selector switch means for selecting a predetermined number of said pulses,
      7. an output means from said selector switch means to said adder,
      8. an output means from said adder to said gate means for opening said gate means during an interval determined by the setting of said selector switch means, and
      9. an output means from said gate means for coupling pulses to drive said pulse motor at a rate determined by the repetition rate of the pulses from the last-said output means.

* * * * *